US008682654B2

(12) United States Patent  
Chen et al.

(10) Patent No.: US 8,682,654 B2  
(45) Date of Patent: Mar. 25, 2014

(54) SYSTEMS AND METHODS FOR CLASSIFYING SPORTS VIDEO

(75) Inventors: Ming-Jun Chen, Tai Nan (TW); Jiun-Fu Chen, Hemei Township, Changhua County (TW); Shih-Min Tang, Jiali Township, Tainan County (TW); Ho-Chao Huang, Shindian (TW)

(73) Assignee: Cyberlink Corp., Taipei (TW)

( * ) Notice: Subject to any disclaimer, the term of this patent is extended or adjusted under 35 U.S.C. 154(b) by 1980 days.

(21) Appl. No.: 11/411,016

(22) Filed: Apr. 25, 2006

(65) Prior Publication Data

US 2007/0250777 A1     Oct. 25, 2007

(51) Int. Cl.
| | |
|---|---|
| G10L 15/00 | (2013.01) |
| G10L 19/00 | (2013.01) |
| G10L 11/06 | (2006.01) |
| G10L 15/20 | (2006.01) |
| G10L 15/06 | (2013.01) |
| G10L 13/00 | (2006.01) |
| G10L 21/00 | (2013.01) |

(52) U.S. Cl.
USPC ........... 704/214; 704/213; 704/233; 704/245; 704/268; 704/270; 704/270.1; 704/273; 704/275; 704/278

(58) Field of Classification Search
USPC ......... 704/214, 245, 268, 278, 270, 213, 273, 704/233, 270.1, 275
See application file for complete search history.

(56) References Cited

U.S. PATENT DOCUMENTS

| | | | |
|---|---|---|---|
| 3,992,029 A | 11/1976 | Washizawa et al. | ........... 280/221 |
| 4,360,213 A | 11/1982 | Rudwick et al. | ............. 280/242 |
| 4,723,364 A | 2/1988 | Marxer | .............................. 36/10 |
| 4,805,749 A | 2/1989 | Gerch | ........................... 190/111 |
| 4,830,154 A | 5/1989 | Gerch et al. | .................. 190/103 |
| 5,387,176 A | 2/1995 | Markoll | ........................... 600/14 |
| 5,538,406 A | 7/1996 | Siegal et al. | .................. 417/360 |
| 5,665,049 A | 9/1997 | Markoll | ........................... 600/14 |
| 5,731,844 A * | 3/1998 | Rauch et al. | .................... 725/40 |
| 5,754,939 A * | 5/1998 | Herz et al. | ................... 455/3.04 |
| 5,758,259 A * | 5/1998 | Lawler | ............................. 725/45 |
| 5,798,785 A * | 8/1998 | Hendricks et al. | .............. 725/46 |

(Continued)

FOREIGN PATENT DOCUMENTS

EP     1531457 A1     5/2005

OTHER PUBLICATIONS

Xiong, Z., Radhakrishnan, R., Divakaran, A., and Huang, T. S. 2003a. Audio-based highlights extraction from baseball, golf and soccer games in a unified framework. In Proceedings of the ICASSP Conference (Hong Kong, China).*

(Continued)

*Primary Examiner* — Edgar Guerra-Erazo  
(74) *Attorney, Agent, or Firm* — McClure, Qualey & Rodack, LLP

(57) ABSTRACT

Disclosed are systems, methods, and computer readable media having programs for classifying sports video. In one embodiment, a method includes: extracting, from an audio stream of a video clip, a plurality of key audio components contained therein; and classifying, using at least one of the plurality of key audio components, a sport type contained in the video clip. In one embodiment, a computer readable medium having a computer program for classifying ports video includes: logic configured to extract a plurality of key audio components from a video clip; and logic configured to classify a sport type corresponding to the video clip.

23 Claims, 6 Drawing Sheets

| SPORT TYPE | KEY AUDIO COMPONENT | FREQUENCY | DISTRIBUTION |
|---|---|---|---|
| AUTO RACING | ENGINE SOUND | CONSTANT | LONG DURATION |
| | COMMENTATOR | INTERMITTENT | SHORT DURATION |
| SUMO WRESTLING | REFEREE SOUND | MEDIUM | REGULAR |
| TENNIS | BALL/RACKET COLLISION | HIGH | GROUPED REGULAR |
| BADMINTON | BIRDIE/RACKET COLLISION | HIGH | GROUPED REGULAR |
| BILLIARDS | BALL COLLISION | MEDIUM | REGULAR |
| BOWLING | BALL/PIN COLLISION | MEDIUM | REGULAR |
| BASEBALL | BALL/BAT COLLISION | LOW | IRREGULAR |
| BASKETBALL | BALL/FLOOR COLLISION | HIGH | REGULAR |
| | WHISTLE | LOW | IRREGULAR |
| SOCCER | WHISTLE | LOW | IRREGULAR |
| HOCKEY | STICK/PUCK COLLISION | MEDIUM | IRREGULAR |
| | WHISTLE | LOW | IRREGULAR |
| | SKATE/ICE ENGAGEMENT | HIGH | REGULAR |
| FIGURE SKATING | SKATE/ICE ENGAGEMENT | HIGH | REGULAR |
| SWIMMING | WATER SPLASH | HIGH | REGULAR |
| DIVING | WATER SPLASH | LOW | REGULAR |
| FOOTBALL | WHISTLE | MEDIUM | REGULAR |
| | HELMET COLLISION | MEDIUM | REGULAR |

(56) References Cited

U.S. PATENT DOCUMENTS

| | | | |
|---|---|---|---|
| 5,912,696 A * | 6/1999 | Buehl | 725/28 |
| 5,970,447 A * | 10/1999 | Ireton | 704/233 |
| 6,020,883 A * | 2/2000 | Herz et al. | 715/721 |
| 6,038,367 A * | 3/2000 | Abecassis | 386/262 |
| 6,085,235 A | 7/2000 | Clarke, Jr. et al. | 709/219 |
| 6,177,931 B1 * | 1/2001 | Alexander et al. | 725/52 |
| 6,185,527 B1 * | 2/2001 | Petkovic et al. | 704/231 |
| 6,195,661 B1 * | 2/2001 | Filepp et al. | 1/1 |
| 6,199,076 B1 * | 3/2001 | Logan et al. | 715/203 |
| 6,236,395 B1 * | 5/2001 | Sezan et al. | 715/723 |
| 6,268,849 B1 * | 7/2001 | Boyer et al. | 725/40 |
| 6,295,092 B1 * | 9/2001 | Hullinger et al. | 348/468 |
| 6,345,252 B1 * | 2/2002 | Beigi et al. | 704/272 |
| 6,404,925 B1 * | 6/2002 | Foote et al. | 382/224 |
| 6,476,308 B1 * | 11/2002 | Zhang | 84/616 |
| 6,570,991 B1 * | 5/2003 | Scheirer et al. | 381/110 |
| 6,654,721 B2 * | 11/2003 | Handelman | 704/270 |
| 6,710,822 B1 * | 3/2004 | Walker et al. | 348/722 |
| 6,714,910 B1 * | 3/2004 | Rose et al. | 704/256 |
| 6,847,682 B2 | 1/2005 | Liang | 375/240.12 |
| 6,928,407 B2 * | 8/2005 | Ponceleon et al. | 704/253 |
| 6,996,171 B1 * | 2/2006 | Walker et al. | 375/240.09 |
| 7,051,352 B1 * | 5/2006 | Schaffer | 725/39 |
| 7,096,486 B1 * | 8/2006 | Ukai et al. | 725/58 |
| 7,277,537 B2 * | 10/2007 | Li | 379/386 |
| 7,370,276 B2 * | 5/2008 | Willis | 715/747 |
| 7,454,331 B2 * | 11/2008 | Vinton et al. | 704/225 |
| 7,533,399 B2 * | 5/2009 | Ma et al. | 725/46 |
| 7,581,237 B1 * | 8/2009 | Kurapati | 725/46 |
| 7,600,244 B2 * | 10/2009 | Maruyama et al. | 725/47 |
| 7,716,704 B2 * | 5/2010 | Wang et al. | 725/46 |
| 7,774,288 B2 * | 8/2010 | Acharya et al. | 706/45 |
| 7,885,963 B2 * | 2/2011 | Sanders | 707/750 |
| 7,962,330 B2 * | 6/2011 | Goronzy et al. | 704/201 |
| 2001/0023401 A1 * | 9/2001 | Weishut et al. | 705/1 |
| 2002/0016966 A1 | 2/2002 | Shirato | 725/47 |
| 2002/0093591 A1 * | 7/2002 | Gong et al. | 348/515 |
| 2002/0133499 A1 * | 9/2002 | Ward et al. | 707/102 |
| 2002/0157116 A1 * | 10/2002 | Jasinschi | 725/136 |
| 2003/0007001 A1 * | 1/2003 | Zimmerman | 345/716 |
| 2003/0093329 A1 * | 5/2003 | Gutta | 705/26 |
| 2003/0093790 A1 * | 5/2003 | Logan et al. | 725/38 |
| 2003/0097186 A1 * | 5/2003 | Gutta et al. | 700/1 |
| 2003/0097196 A1 * | 5/2003 | Gutta et al. | 700/100 |
| 2003/0101451 A1 * | 5/2003 | Bentolila et al. | 725/34 |
| 2003/0147466 A1 | 8/2003 | Liang | 375/240.12 |
| 2004/0070594 A1 * | 4/2004 | Burke | 345/716 |
| 2004/0078188 A1 * | 4/2004 | Gibbon et al. | 704/1 |
| 2004/0098376 A1 * | 5/2004 | Li et al. | 707/3 |
| 2004/0158853 A1 * | 8/2004 | Doi et al. | 725/38 |
| 2004/0201784 A9 * | 10/2004 | Dagtas et al. | 348/738 |
| 2004/0210436 A1 * | 10/2004 | Jiang et al. | 704/222 |
| 2005/0131688 A1 * | 6/2005 | Goronzy et al. | 704/240 |
| 2005/0139621 A1 | 6/2005 | Foster | 222/521 |
| 2005/0160449 A1 * | 7/2005 | Goronzy et al. | 725/5 |
| 2005/0195331 A1 | 9/2005 | Sugano et al. | 348/571 |
| 2005/0216260 A1 * | 9/2005 | Ps et al. | 704/213 |
| 2006/0123448 A1 * | 6/2006 | Ma et al. | 725/51 |
| 2006/0149693 A1 * | 7/2006 | Otsuka et al. | 706/20 |
| 2006/0251385 A1 * | 11/2006 | Hwang et al. | 386/54 |
| 2007/0216538 A1 * | 9/2007 | Thelen et al. | 340/825.69 |
| 2007/0250313 A1 * | 10/2007 | Chen et al. | 704/233 |
| 2007/0271287 A1 * | 11/2007 | Acharya et al. | 707/101 |
| 2008/0138029 A1 * | 6/2008 | Xu et al. | 386/46 |
| 2008/0140406 A1 * | 6/2008 | Burazerovic et al. | 704/260 |
| 2011/0106531 A1 * | 5/2011 | Liu et al. | 704/214 |

OTHER PUBLICATIONS

M. Xu, N. C. Maddage, C.-S. Xu, M. Kankanhalli, Q. Tian, "Creating Audio Keywords for Event Detection in Soccer Video," In Proc. of ICME 2003, pp. 281-284, 2003.*

R. Radhakrishan, Z. Xiong, A. Divakaran, Y. Ishikawa, "Generation of sports highlights using a combination of supervised & unsupervised learning in audio domain", In Proc. of International Conference on Pacific Rim Conference on Multimedia, vol. 2, pp. 935-939, Dec. 2003.*

Sadlier, D., Marlow, S., O'Connor, N., and Murphy, N. MPEG Audio Bitstream Processing Towards the Automatic Generation of Sports Programme Summaries. In Proceedings of the IEEE International Conference on Multimedia and Expo (ICME 2002) (Lausanne, Switzerland, Aug. 26-29, 2002).*

E. Wold, T. Blum, D. Keislar, and J. Wheaton, "Content-based classification, search, and retrieval of audio," IEEE Multimedia, vol. 3, No. 2, 1996.*

Tjondronegoro, "Content-based Video Indexing for Sports Applications using Integrated Multi-Modal Approach", PhD Thesis, Deakin University, May 2005.*

W. Zhou, S. Dao, and C.-C. Jay Kuo, On-Line Knowledge- and Rule-Based Video Classification System for Video Indexing and Dissemination,Information Systems, vol. 27, No. 8, 2002, pp. 559-586.*

D. Tjondronegoro, Y.-P.P. Chen, and B. Pham, "Sports Video Summarization Using Highlights and Play-Breaks," Proc. ACM SIGMM Int'l Workshop Multimedia Information Retrieval, ACM Press, 2003, pp. 201-208.*

Messer K et al.,"Automatic Sports Classification" Pattern Recognition, 2002. Proceedings.

Zhu Liu et al., "Audio Feature Extraction and Analysis for Scene Segmentation and Classification" Journal of VLSI signal processing systems for signal, image, and video technology, Springer, New York, NY, US, vol. 20, No. 1/2, Oct. 1998 (Oct. 1998), pp. 61-78, Xp000786728 ISSN: 0922-5773.

Kieron Messer, William Christmas, and Josef Kittler, "Automatic Sports Classification", University of Surrey, Guildford GU2 7XH. Uk., pp. 1005-1008.

Zhu Liu, Yao Wang, and Tsuhan Chen, "Audio Feature Extraction and Analysis for Scene Segmentation and Classification," XP-000786728, 1998, pp. 61-78.

European Search Report on Application No. EP 06 02 0505, place of search The Hague, Jul. 2, 2007.

* cited by examiner

| SPORT TYPE (150) | KEY AUDIO COMPONENT (152) | FREQUENCY (154) | DISTRIBUTION (156) |
|---|---|---|---|
| AUTO RACING | ENGINE SOUND | CONSTANT | LONG DURATION |
| AUTO RACING | COMMENTATOR | INTERMITTENT | SHORT DURATION |
| SUMO WRESTLING | REFEREE SOUND | MEDIUM | REGULAR |
| TENNIS | BALL/RACKET COLLISION | HIGH | GROUPED REGULAR |
| BADMINTON | BIRDIE/RACKET COLLISION | HIGH | GROUPED REGULAR |
| BILLIARDS | BALL COLLISION | MEDIUM | REGULAR |
| BOWLING | BALL/PIN COLLISION | MEDIUM | REGULAR |
| BASEBALL | BALL/BAT COLLISION | LOW | IRREGULAR |
| BASKETBALL | BALL/FLOOR COLLISION | HIGH | REGULAR |
| BASKETBALL | WHISTLE | LOW | IRREGULAR |
| SOCCER | WHISTLE | LOW | IRREGULAR |
| HOCKEY | STICK/PUCK COLLISION | MEDIUM | IRREGULAR |
| HOCKEY | WHISTLE | LOW | IRREGULAR |
| HOCKEY | SKATE/ICE ENGAGEMENT | HIGH | REGULAR |
| FIGURE SKATING | SKATE/ICE ENGAGEMENT | HIGH | REGULAR |
| SWIMMING | WATER SPLASH | HIGH | REGULAR |
| DIVING | WATER SPLASH | LOW | REGULAR |
| FOOTBALL | WHISTLE | MEDIUM | REGULAR |
| FOOTBALL | HELMET COLLISION | MEDIUM | REGULAR |

FIG. 3

SYSTEMS AND METHODS FOR CLASSIFYING SPORTS VIDEO

TECHNICAL FIELD

The present disclosure is generally related to video signal processing and, more particularly, is related to systems, methods, and computer readable media having programs for classifying sports video.

BACKGROUND

In recent years, among the various kinds of multimedia, video is becoming an important component. Video refers to moving images together with sound and can be transmitted, received, and stored in a variety of techniques and formats. Video can include many different genres including, but not limited to episodic programming, movies, music, and sports, among others. End users, editors, viewers, and subscribers may wish to view only selected types of content within each genre. For example, a sports viewer may have great interest in identifying specific types of sporting events within a video stream or clip. Previous methods for classifying sports video have required the analysis of video segments and corresponding motion information. These methods, however, require significant processing resources that may be costly and cumbersome to employ.

SUMMARY

Embodiments of the present disclosure provide a system, method, and computer readable medium having a program for classifying sports video. In one embodiment a system includes: logic configured to collect a plurality of key audio samples from a plurality of types of sports; logic configured to extract a plurality of sample audio features from a plurality of frames within each of the plurality of key audio samples; logic configured to generate a plurality of patterns corresponding to the plurality of key audio samples; logic configured to extract a plurality of audio features from the plurality of frames within an audio stream of a video clip; logic configured to compare the plurality of sample audio features in the plurality of patterns with the a plurality of audio features extracted from the audio stream; and logic configured to classify the video clip based on the location and the frequency of the key audio components.

In another embodiment, a method includes: extracting, from an audio stream of a video clip, a plurality of key audio components contained therein; and classifying, using at least one of the plurality of key audio components, a sport type contained in the video clip.

In a further embodiment, a computer readable medium having a computer program for classifying sports video includes: logic configured to extract a plurality of key audio components from a video clip; and logic configured to classify a sport type corresponding to the video clip.

Other systems and methods will be or become apparent from the following drawings and detailed description.

BRIEF DESCRIPTION OF THE DRAWINGS

The components in the drawings are not necessarily to scale, emphasis instead being placed upon clearly illustrating the principles of the present disclosure. In the drawings, like reference numerals designate corresponding parts throughout the several views.

FIG. 3 is a table illustrating exemplary embodiments of sports types as related to key audio components.

DETAILED DESCRIPTION

Reference will now be made to the drawings. While the disclosure will be provided in connection with these drawings, there is no intent to limit the disclosure to the embodiment or embodiments disclosed herein. On the contrary, the intent is to cover all alternatives, modifications, and equivalents.

Figure 1:
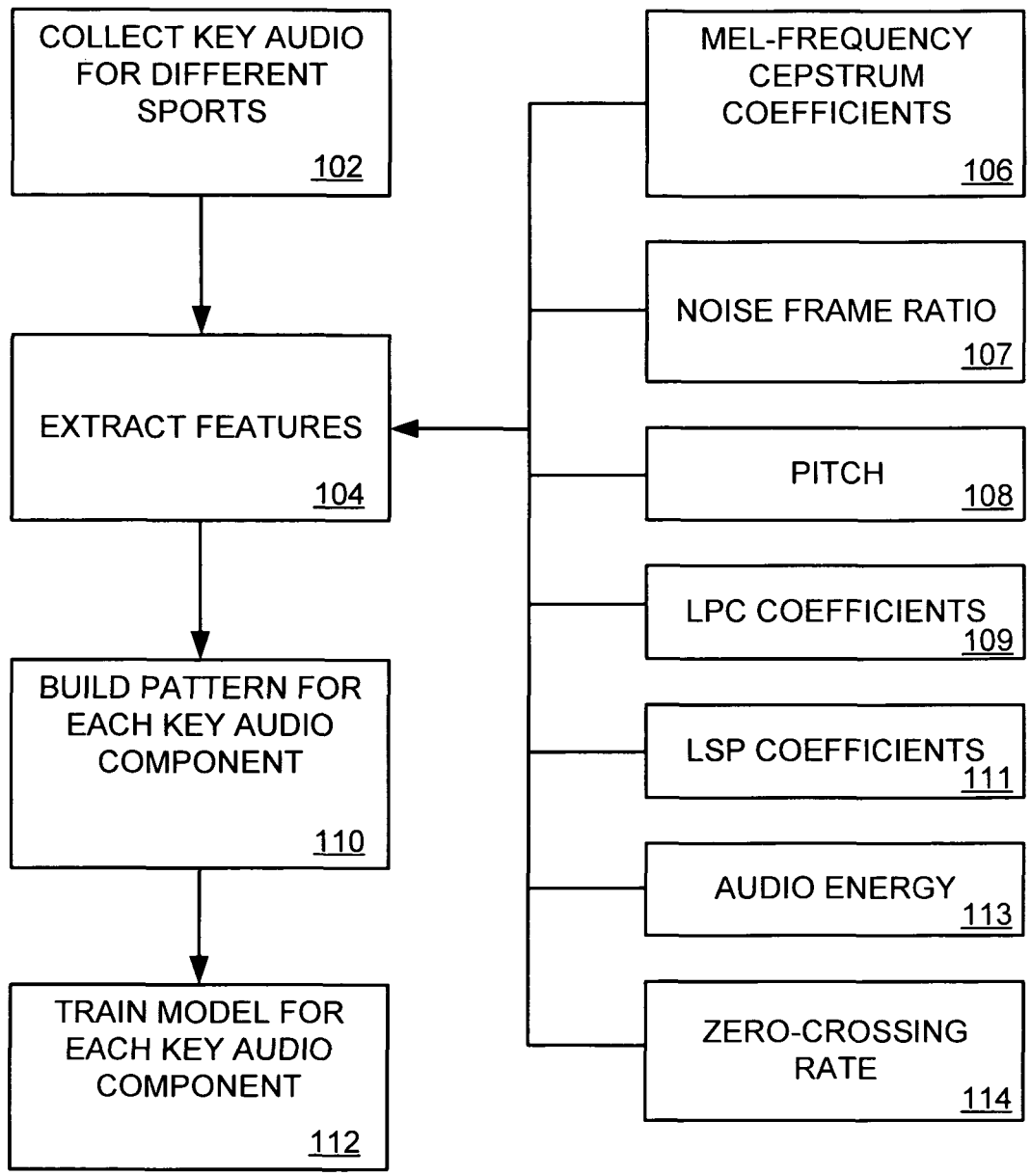
FIG. 1 is a block diagram illustrating an embodiment of building patterns for use in classifying sports video.

Beginning with FIG. 1, illustrated is a block diagram of an embodiment for building patterns for use in classifying sports video. The patterns can include patterns of one or more data features for key audio components. The patterns can be compared to the same data features of video clips. In building the patterns, key audio components are collected for different sports in block 102. The key audio components can be collected for any number of sports including, but not limited to, auto racing, sumo wrestling, billiards, and figure skating, among others. Examples of key audio components contained within these types of sports can include, for example, an engine sound, a referee sound, any number of ball related collisions and a whistle, among others.

In block 104, features are extracted for the key audio components. Features can include, but are not limited to, mel-frequency cepstrum coefficients 106, noise frame ratio 107, and pitch 108. For example, other features that can be used include LPC coefficients 109, LSP coefficients 111, audio energy 113, and zero-crossing rate 114. The mel-frequency cepstrum coefficients are derived from the known variation of critical bandwidths of the human ear. Filters are spaced linearly at low frequencies and logarithmically at high frequencies and a compact representation of an audio feature can be produced using coefficients corresponding to each of the bandwidths. These features can be extracted in a frame by frame manner. After the features are extracted in block 104, a pattern is built for each key audio component 110. The pattern can include the specific mel-frequency cepstrum coefficients 106 and pitch 108 that are exclusive to the key audio component. A model for each key audio component is trained in block 112 in order to capture the unique audio characteristics of the key audio component without being constrained by the limitations of a particular sample of the key audio component.

Figure 2:
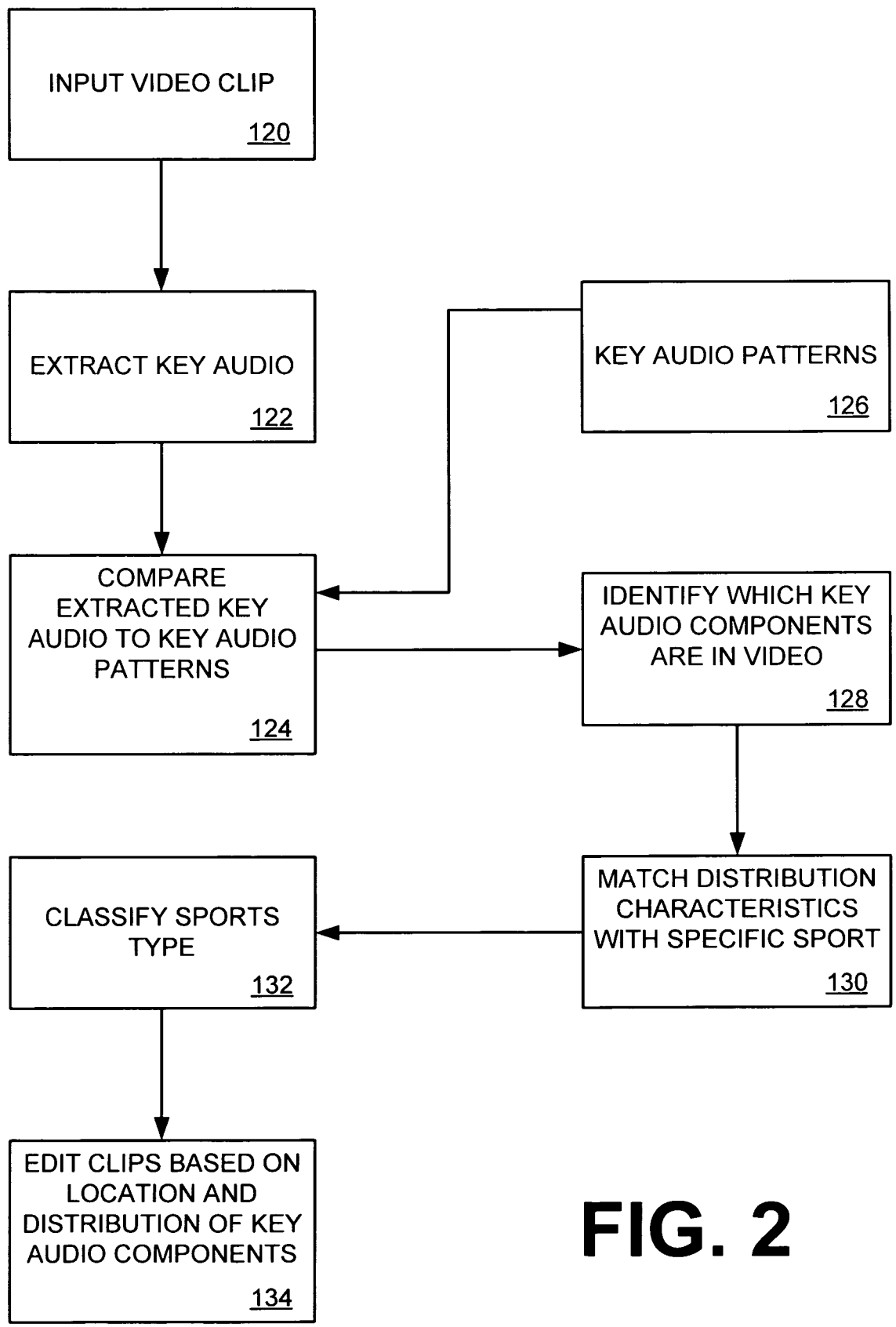
FIG. 2 is a block diagram illustrating an embodiment that uses the patterns of FIG. 1 to classify sports video.

Reference is now made to FIG. 2, which is a functional block diagram illustrating use of the patterns of FIG. 1 to classify sports video. A video clip is input in block 120 and the key audio components are extracted from the video clip in block 122. The video clip can be a digital or analog streaming video signal or a video stored on a variety of storage media types. For example, the video can be stored in solid state hardware or on magnetic or optical storage media using analog or digital technology. The extracted key audio components are compared to key audio patterns 126, in block 124.

The key audio components contained in the video are identified in block 128. Identifying the key audio components in the video can serve to significantly narrow the number of possible sport types and, in some cases, completely determine the sports type. For example, an engine noise will only occur in a small number of sports types, namely those performed using motorized vehicles.

Distribution and frequency characteristics corresponding to a specific sport are matched in block 130 and the video is classified as a particular sports type in block 132. The distribution and frequency characteristics in combination with the identity of the key audio components can be used to specifically classify the sports type. For example, the distribution and frequency of a ball bouncing in a basketball game are distinctive from those occurring in a tennis match. Further, optionally, the video clips can be edited based on the location and distribution of key audio components in block 134. For example, in a football game the time between plays can be edited out of a video clip by retaining the portion of the video segment that occurs starting a few seconds before a helmet collision key audio component and ending a few seconds after a whistle key audio component. One example of an audio distribution coefficient is the tempo of the occurrence of a key audio component, as expressed in, for example, the time domain.

Reference is now made to FIG. 3, which is a table illustrating exemplary embodiments of sports types as related to key audio components. The table includes a column for sports type 150, which features an example of a variety of different sports that can be classified under the methods and systems herein. The table also includes a key audio component column 152 that lists the one or more key audio components corresponding to the sports type of column 150. The table also includes a frequency column 154, which includes an estimated frequency of occurrence corresponding to the key audio component 152 in a sports type listed in column 150. Similarly, a table also includes a distribution column 156 that categorizes a likely distribution of the key audio components within a typical event corresponding to the sports type in column 150.

By way of example, a key audio component 152 may be extracted from a sports video and identified as a whistle. In the absence of any other key audio components 152, if the whistle occurs at a low frequency throughout the event and at irregular intervals, the event may be classified based on the timing and/or regularity of the whistle (e.g. classified as a soccer match). Alternatively, where the video includes a second key audio component 152 such as a ball/floor collision or a stick/puck collision, the sport type 150 can be categorized with greater certainty (e.g. as a basketball or hockey game, respectively). Other sport types 150 may include the same key audio component 152 and only be distinguishable by frequency 154 for distribution 156. For example, the key audio component of a water splash as found in swimming and diving events may differ only in the frequency of the water splash. Alternatively, the swimming event may include a second key audio component 152 such as a starter pistol. In this manner, many different formats of the same sport can be classified through the use of the key audio components 150.

Figure 4A:
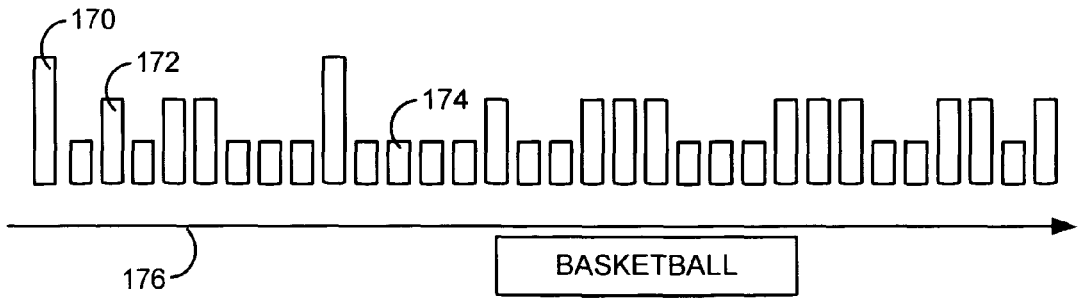
FIGS. 4A-4D are diagrams illustrating audio component sample strings corresponding to different sports types.

Reference is now made to FIGS. 4A-4D, which are diagrams illustrating audio component sample strings corresponding to different types of sports. Reference is first made to FIG. 4A, which is an audio component sample stream corresponding to a basketball game. Each of the bars represent an audio sample that occurs along a timeline 176. The relevance of the bars to the classification of the sports video is illustrated by the different heights of the bars. For example, a tallest bar represents a first audio component 170. A mid-sized bar represents a second audio component 172 and a short bar represents other audio 174. The first audio component 170 in this example may be a whistle. The second audio component 172 of this example might be a ball/floor collision, which occurs as a basketball being bounced on a basketball court. Note that the low-frequency of occurrence of the first audio component 170, or whistle, that occurs in an irregular distribution throughout the time of the event can occur in a basketball game and a hockey game. However, the high-frequency of occurrence at relatively regular intervals of the second audio component 172, or ball/floor collision, provides a unique audio pattern corresponding to a basketball game.

Figure 4B:
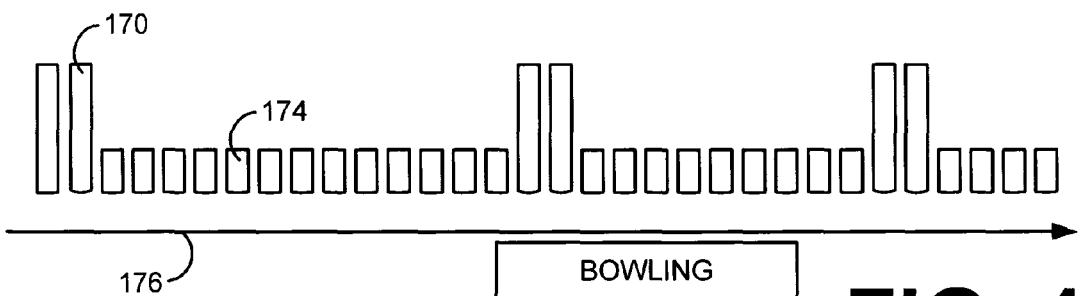
Figure 4C:
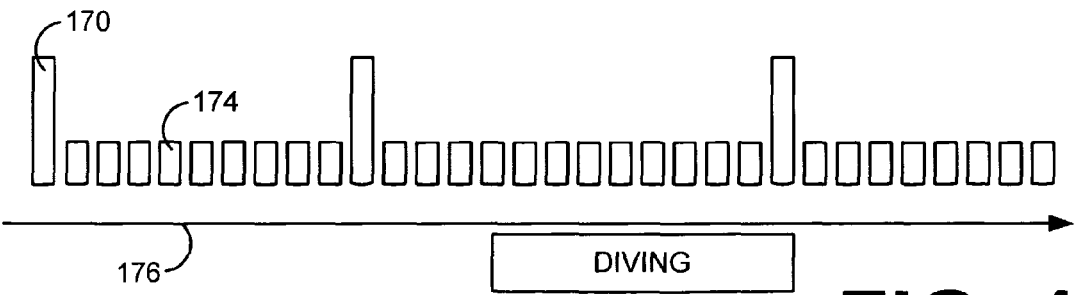
Figure 4D:
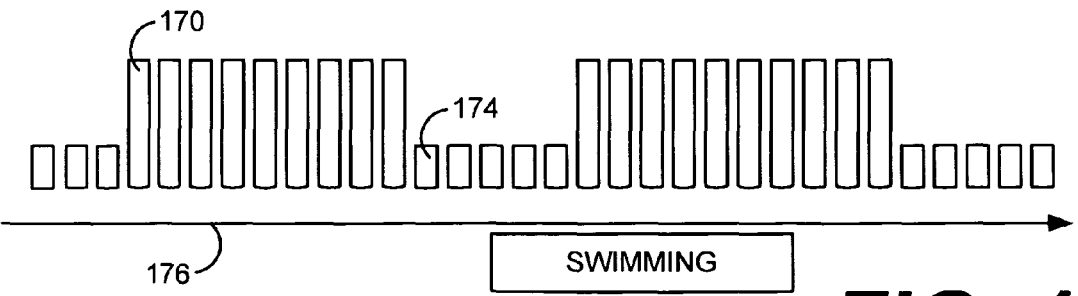

Similarly, the audio component sample string of FIG. 4B is identified as a bowling match where a first key audio component 170 of a ball/pin collision is contained in the video at a medium frequency and with a regular distribution. FIGS. 4C and 4D both feature as first audio components 170, a water splash. However, in the diving competition of FIG. 4C, the first audio component 170 occurs relatively infrequently at a regular distribution throughout the event. In contrast, the first audio component 170 of the swimming contest has a high frequency of occurrence and a regular distribution throughout the swimming contest. Additionally, other key audio components, such as, for example, a starter pistol report, might be identified for these types of matches to further aid in classifying the sports video and optionally editing the sports video.

Figure 5:
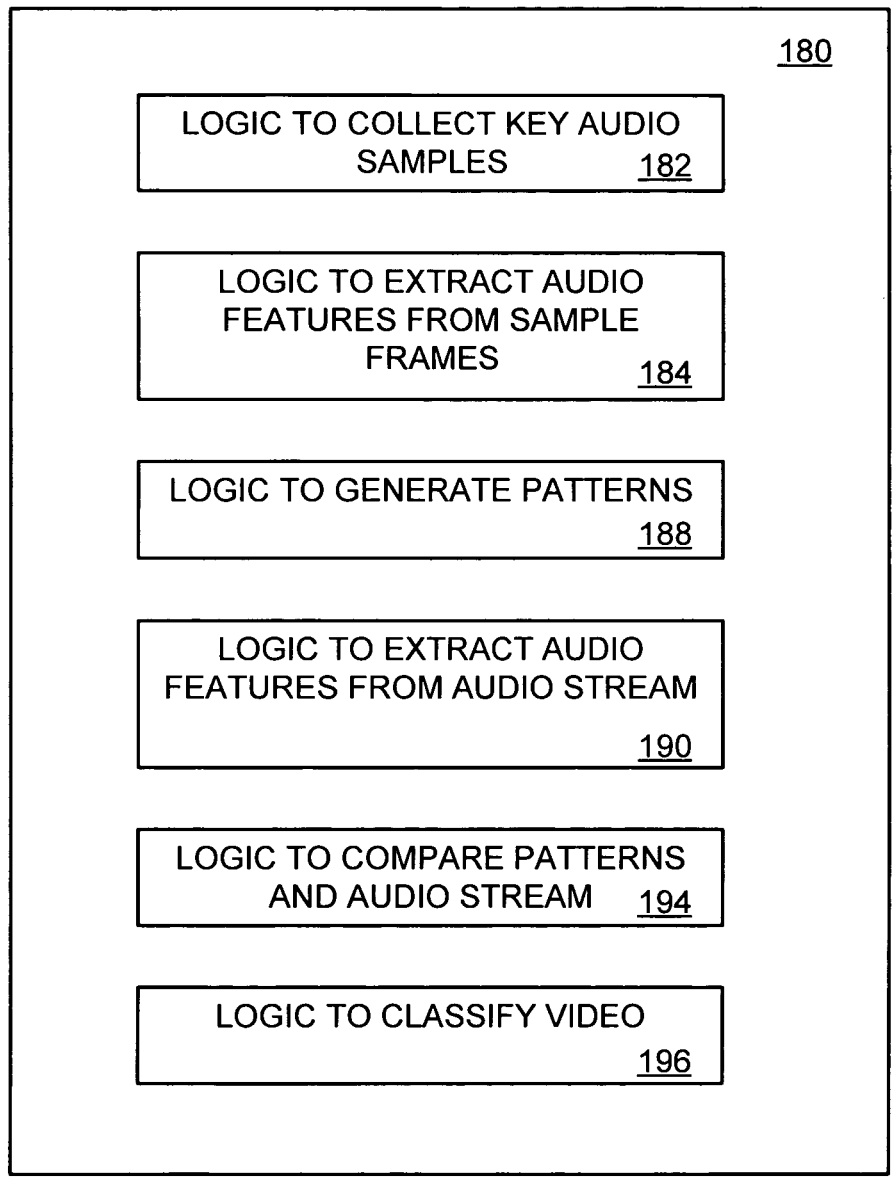
FIG. 5 is a block diagram illustrating an embodiment of a system for classifying sports video.

Reference is now made to FIG. 5, which is a block diagram illustrating an embodiment of a system for classifying sports video. The system 180 includes logic to collect key audio samples in block 182. The system 180 further includes logic to extract audio features from the key audio samples on a frame by frame basis in block 184. The audio features can be represented, for example, by audio coefficients selected from a variety of those known to one of ordinary skill in the art including, but not limited to, mel-frequency cepstrum coefficients, pitch, LPC coefficients, LSP coefficients, audio energy, zero-crossing-rate, and noise frame ratios, among others. By way of example, the mel-frequency cepstrum coefficients provide a compact representation of an audio feature that can be produced using coefficients corresponding to a specific series of band-widths. The system 180 can utilize one or more types of features alone or in combination to define specific key audio component features that can be utilized by the logic to generate patterns in block 188.

The system 180 further includes logic to extract audio features from an audio stream of a video clip in block 190. A video clip can be a digital or analog streaming video signal or a video stored on a variety of storage media types. The audio features from the patterns are compared to the audio features from the audio stream in the logic of block 194. Based on the outcome of the comparison and the logic of block 194, the video is classified by sports type in the logic block 196. In addition to comparing the type of audio components in the patterns and the video clip, the distribution and frequency of occurrence of the key audio components can also be compared.

Figure 6:
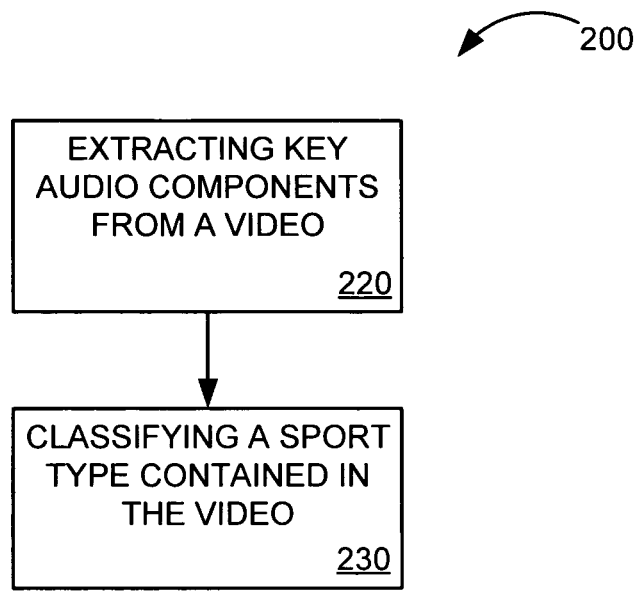
FIG. 6 is a block diagram illustrating an embodiment of a method for classifying sports video.

Reference is now made to FIG. 6, which is a block diagram illustrating an embodiment of a method for classifying sports video. The method 200 begins with extracting key audio components from a video in block 220. The key audio components contained in the video can be identified by comparison to, for example, patterns for key audio components. In this regard, patterns can be stored, for example, in a database or other data storage application that resides in any one of a variety of computer storage or processing environments or devices.

The key audio components correspond to specific identifiable audio events that occur within the audio stream of specific sports videos. For example, a key audio component of an auto racing sporting event can be an engine sound. Similarly, a key audio component of a sumo wrestling event can be the unique referee sound made at the beginning of each match. Further, the sound of a whistle may be a key audio component in a basketball game. While the whistle is not exclusive to the game of basketball, the frequency of whistle sounds combined with the distribution of the whistle sounds can be utilized in combination with other key audio components to determine whether or not a sports video is a basketball game. For example, a sports video of a hockey game may include the key audio component of a whistle and a key audio component of a skate/ice engagement sound. Alternatively, a soccer match may include a whistle sound as a key audio component with few or no other key audio components identified. In this case, the frequency of occurrence in the distribution throughout the match would be used to identify the video as a soccer match.

After extracting the key audio components, the method 200 further includes classifying a sport type contained in the video in block 230. By determining the type of key audio components, the frequency of occurrence of each of the key audio components, and the distribution of the key audio components within the video, the video can be classified as a specific sport type.

Figure 7:
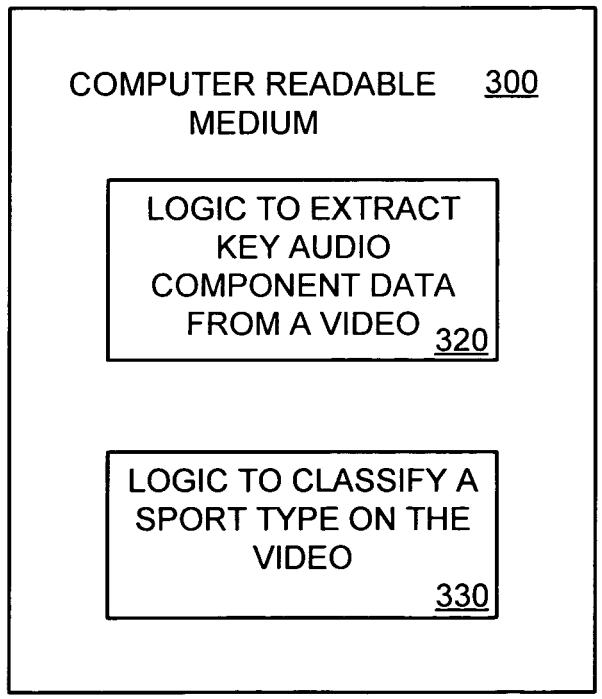
FIG. 7 is a block diagram illustrating an embodiment of a computer readable medium having a program for classifying sports video.

Reference is now made to FIG. 7, which is a block diagram illustrating an embodiment of a computer-readable medium having a program for classifying sports video. The computer-readable medium 300 includes logic to extract key audio component data from a video in block 320. The video can be a digital or analog streaming video signal or a video stored on a variety of storage media types. The key audio component data is extracted from an audio stream of the video.

The computer-readable medium 300 also includes logic to classify a sports type of the video in block 330. Classification is performed by comparing the key audio components from samples with the key audio component data from the video. In some embodiments a pattern corresponding to each key audio component can be used for the comparison. In this manner, the key audio components can be identified. Additionally, the frequency of occurrence within the video and the distribution throughout the video are determined for classifying the sports type of video. The distribution and frequency information can be further utilized to edit the video.

Embodiments of the present disclosure can be implemented in hardware, software, firmware, or a combination thereof. Some embodiments can be implemented in software or firmware that is stored in a memory and that is executed by a suitable instruction execution system. If implemented in hardware, an alternative embodiment can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of an embodiment of the present disclosure in which functions may be executed out of order from that shown or discussed, including substantially concurrently or in reverse order, depending on the functionality involved, as would be understood by those reasonably skilled in the art of the present disclosure.

A program according to this disclosure that comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the present disclosure includes embodying the functionality of the illustrated embodiments of the present disclosure in logic embodied in hardware or software-configured mediums.

It should be emphasized that the above-described embodiments of the present disclosure, particularly, any illustrated embodiments, are merely possible examples of implementations. Many variations and modifications may be made to the above-described embodiment(s) of the disclosure without departing substantially from the spirit and principles of the disclosure.

At least the following is claimed:

1. A system for classifying sports video, comprising:
a processor;
a memory storing instructions that when execute cause the system to:
collect a plurality of key audio samples from a plurality of types of sports;
extract a plurality of sample audio features from a plurality of frames within each of the plurality of key audio samples;
generate a plurality of patterns corresponding to the plurality of key audio samples;
extract a plurality of audio features from the plurality of frames within an audio stream of a video clip;
compare the plurality of sample audio features in the plurality of patterns with the a plurality of audio features extracted from the audio stream; and
classify the video clip into a sport type from a plurality of sport types based on the location, the distribution, and the frequency of the key audio components, wherein the classification based on the distribution compares a first distribution of the plurality of key audio components with a second distribution of key audio components which corresponds to one of the plurality of sport types, wherein the first and second distributions are related to a regularity of the occurrences of the respective key audio components.

2. The system of claim 1, further comprising means for editing the video clip by using the location and distribution of the plurality of key audio components within the video clip.

3. The system of claim 1, wherein a portion of the plurality of audio features are selected from the group consisting of: mel-frequency cepstrum coefficients, pitch, LPC coefficients, LSP coefficients, audio energy, zero-crossing-rate, and noise frame ratio.

4. A method for classifying sports video, comprising:
extracting, using an instruction execution system, a plurality of key audio components from an audio stream of a video clip; and
classifying, using the instruction execution system, the video clip into a sport type from a plurality of sport types, based on a comparison of a first distribution of one or more of the plurality of key audio components extracted from the audio stream as compared to a second distribution of key audio components which corresponds to one of the plurality of sport types, wherein the first and second distributions are related to the regularity of the occurrences of the respective key audio components.

5. The method of claim 4, further comprising generating, using the instruction execution system, a plurality of patterns corresponding to a plurality of key audio components.

6. The method of claim 5, wherein the generating further comprises collecting the plurality of key audio components that correspond to a plurality of sports.

7. The method of claim 6, wherein the generating further comprises determining a plurality of features for each of the plurality of key audio components.

8. The method of claim 7, wherein a portion of the plurality of features are selected from the group consisting of: mel-frequency cepstrum coefficients, pitch, LPC coefficients, LSP coefficients, audio energy, zero-crossing-rate, and noise frame ratio.

9. The method of claim 7, wherein the generating further comprises determining a plurality of patterns of the plurality of features, wherein each pattern of the plurality of patterns corresponds to one of the plurality of key audio components.

10. The method of claim 9, wherein the generating further comprises training a model for each of the plurality of key audio components using the corresponding pattern of features.

11. The method of claim 4, wherein the extracting comprises determining a plurality of features from an audio stream of a video clip, wherein each of the features corresponds to one of a plurality of frames in the video clip.

12. The method of claim 11, wherein a portion of the plurality of features are selected from the group consisting of: mel-frequency cepstrum coefficients, pitch, LPC coefficients, LSP coefficients, audio energy, zero-crossing rate, and noise frame ratio.

13. The method of claim 4, wherein the extracting comprises comparing the plurality of features in the audio stream with the plurality of patterns.

14. The method of claim 13, wherein the comparing comprises determining which of the plurality of key audio components is present in the video clip.

15. The method of claim 13, wherein the comparing comprises determining a distribution of the plurality of key audio components that occur in the video clip.

16. The method of claim 4, wherein an event that generates one of the plurality of key audio components is selected from the group consisting of: a ball strike, a whistle sound, a car engine sound, a water splash, a referee sound, a commentator sound, and a bell ringing.

17. A non-transitory computer readable medium storing instructions for classifying sports video, wherein the instructions when executed by an instruction execution system cause the instruction execution system to at least:
extract a plurality of key audio components from a video clip; and
classify the video clip into a sport type in a plurality of sport types, based on a comparison of a first distribution of one or more of the plurality of key audio components extracted from the audio stream as compared to a second distribution of key audio components which corresponds to one of a plurality of sport types, wherein the first and second distributions are related to the regularity of the occurrences of the respective key audio components.

18. The non-transitory computer readable medium of claim 17, wherein the instructions when executed by the instruction execution system further cause the instruction execution system to at least generate a plurality of key audio patterns corresponding to a plurality of key audio sample components.

19. The non-transitory computer readable medium of claim 17, wherein the instructions when executed by the instruction execution system further cause the instruction execution system to at least determine a plurality of audio characteristics from the video clip.

20. The non-transitory computer readable medium of claim 19, wherein a portion of the plurality of audio characteristics are selected from the group consisting of: mel-frequency cepstrum coefficients, pitch, LPC coefficients, LSP coefficients, audio energy, zero-crossing-rate, and noise frame ratio.

21. The non-transitory computer readable medium of claim 17, wherein the instructions when executed by the instruction execution system further cause the instruction execution system to at least compare the plurality of audio characteristics within the video clip to the plurality of key audio patterns.

22. The non-transitory computer readable medium of claim 17, wherein the instructions to classify the sport type further cause the instruction execution system to determine the sport type based on which of the key audio components is in the video clip.

23. The non-transitory computer readable medium of claim 17, wherein the instructions to classify the sport type further cause the instruction execution system to determine the sport type based on a distribution of the key audio components within the video clip.

* * * * *